United States Patent [19]
Taylor

[11] Patent Number: 5,184,849
[45] Date of Patent: Feb. 9, 1993

[54] SECURITY SYSTEM METHOD AND ARTICLE FOR PHOTOCOPIERS AND TELEFAX MACHINES

[76] Inventor: Geoffrey L. Taylor, 211 Oak Street, Winnipeg, Manitoba, Canada, R3M 3P7

[21] Appl. No.: 696,736

[22] Filed: May 7, 1991

[51] Int. Cl.⁵ .............................................. B42D 15/00
[52] U.S. Cl. .................................... 283/67; 283/902; 283/901; 283/12; 380/54
[58] Field of Search .................... 283/67, 94, 73, 902, 283/901, 17; 380/54

[56] References Cited

U.S. PATENT DOCUMENTS

| | | | |
|---|---|---|---|
| 2,952,080 | 9/1960 | Avakian et al. | 283/94 X |
| 4,582,346 | 4/1986 | Caprio et al. | 283/94 |
| 5,018,767 | 5/1991 | Wicker | 283/67 |

*Primary Examiner*—Timothy V. Eley
*Assistant Examiner*—Willmon Fridie, Jr.
*Attorney, Agent, or Firm*—William L. Chapin

[57] ABSTRACT

A method and article for optically encoding copies of a printed document to make the copies unreadable to a casual observer uses a mask having alternating transparent and opaque, white-colored areas placed over the document prior to making a first photocopy of the document, referred to as a first coded half. The opaque regions of the mask, which preferably are spatially periodic, obscure portions of printed letters to make the first coded half unreadable. The mask is then shifted in location relative to the document so as to position transparent regions of the mask over formerly obscured areas, and vice versa. A second photocopy, or second coded half is then made. The first and second coded halves are then physically transmitted or telefaxed to a recipient, who must superimpose the first and second coded halves to render the document readable.

27 Claims, 8 Drawing Sheets

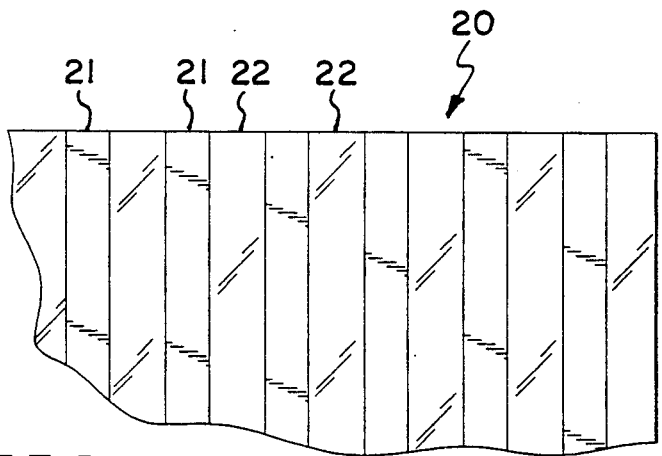

*FIG. 3*

```
FAX TO:
Shakey Business Co.
FAX NUMBER:
555-1212
ATTENTION: Mr. Les Cash
V.P. Finance
REF: Cash Flow Statement Apr 90
Date: 29 Mar 90
NUMBER OF PAGES INC COVER: 2
RETURN FAX NUMBER:
(204) 943-9206

This message may be recreated using the following
technique:
1. Make a copy of page 1. on a transparency.
2. Make a copy of page 2.
3. Hold the transparency on top of the copy of page 2.

Message: Les we're not going to make payroll this month
unless you can do something creative.  It seems that all of
the company's trade secrets are leaking out.  We need to do a
complete check of the mail room staff to see if we can't put
a stop to this.  Perhaps you should consider not using the
FAX for important documents and have everything couriered.  I
know all the people in the mail room and I don't think they
would do it for profit but they get to see so much of the
vital information that goes out to all of your creditors an
it must be difficult not to discuss what they read over
coffee.
        I hope you can find a way around this problem and fast!

I. M. Wabley
                        Chief Accountant
                        Cash Management Services Inc.
```

*FIG. 4*

FAX TO:
Shakey Business Co.

FAX NUMBER:
555-1212

ATTENTION: Mr. Les Cash
V.P. Finance

REF: Cash Flow Statement Apr 90

Date: 29 Mar 90

NUMBER OF PAGES INC COVER: 2

RETURN FAX NUMBER:
(204) 943-9206

This message may be recreated using the following technique:
1. Make a copy of page 1. on a transparency.
2. Make a copy of page 2.
3. Hold the transparency on top of the copy of page 2.

FYIO SECURITY MASK  VISION ENGINEERING, WPG., MAN.

FIG. 5

FAX TO:
Shakey Business Co.

FAX NUMBER:
555-1212

ATTENTION: Mr. Les Cash
V.P. Finance

REF: Cash Flow Statement Apr 90

Date: 29 Mar 90

NUMBER OF PAGES INC COVER: 2

RETURN FAX NUMBER:
(204) 943-9206

This message may be recreated using the following technique:
1. Make a copy of page 1. on a transparency.
2. Make a copy of page 2.
3. Hold the transparency on top of the copy of page 2.

FIG. 6

FAX TO:
Shakey Business Co.

FAX NUMBER:
555-1212

ATTENTION: Mr. Les Cash
V.P. Finance

REF: Cash Flow Statement Apr 90

Date: 29 Mar 90

NUMBER OF PAGES INC COVER: 2

RETURN FAX NUMBER:
(204) 943-9206

This message may be recreated using the following technique:
1. Make a copy of page 1. on a transparency.
2. Make a copy of page 2.
3. Hold the transparency on top of the copy of page 2.

FIG. 9

FAX TO:
Shakey Business Co.

FAX NUMBER:
555-1212

ATTENTION: Mr. Les Cash
V.P. Finance

REF: Cash Flow Statement Apr 90

Date: 29 Mar 90

NUMBER OF PAGES INC COVER: 2

RETURN FAX NUMBER:
(204) 943-9206

This message may be recreated using the following technique:
1. Make a copy of page 1. on a transparency.
2. Make a copy of page 2.
3. Hold the transparency on top of the copy of page 2.

FIG. 10

SECURITY SYSTEM METHOD AND ARTICLE FOR PHOTOCOPIERS AND TELEFAX MACHINES

BACKGROUND OF THE INVENTION

A. Field of the Invention

The present invention relates to methods for enhancing the confidentiality of printed or typed messages. More particularly, the invention relates to a method and article for transmitting photocopies and telefax messages in a manner preventing a casual observer from reading messages contained in the documents.

B. Description of Background Art

Photocopying machines, perhaps as well as any other modern technological development, typifies that class of devices that causes many of us to "wonder how we ever did without them." Thus, many businesses, organizations and other enterprises, even small ones, possess one or more photocopying machines.

As is true of most every technological development, photocopying machines can be misused. Moreover, the use of photocopying machines can sometimes have effects not desired by the management of the organization or enterprise possessing the machine, for the following reasons.

In almost any organization, memos, letters or other documents are sometimes generated which contain sensitive information, which the author wishes be kept confidential. When copies of such sensitive documents are made on a photocopying machine, it would sometimes be desirable to prevent the contents of the document from being read by a casual observer. The present inventor is unaware of the existence of any simple prior art system which addresses the problem of making photocopied documents readily readable by an intended recipient, but unreadable by a casual observer.

Another office machine which is coming into widespread use at an even more rapid rate than the photocopying machine is the facsimile transmitting machine or "telefax." Telefax messages are most often transmitted from one location to a relatively remote location, whether that be a location across the street, across town, or half way around the world. Therefore, the sender of a telefax message frequently has little, if any, control over who might view the message.

Telefax machines optically scan an original document and produce a digital data stream corresponding to an image of the document. Thus, standard data encryption devices and methods may be used to transmit secure telefax messages. However, such devices and methods are generally complicated and costly.

In view of the considerations stated above, it would seem to be desirable to make available a simple, low cost method for making secure photocopies and telefax transmissions, secure being defined here as being unreadable by a casual observer. The present invention was conceived of in response to a perceived need for such a security system for photocopies and telefax messages.

OBJECTS OF THE INVENTION

An object of the present invention is to provide a method and article for rendering information contained in photocopies and facsimiles transmitted by a telefax machine unreadable by a casual observer.

Another object of the invention is to provide a method and article for optically encoding and decoding photocopied and telefaxed documents, thereby maintaining the confidentiality of information contained in the documents.

Various other objects and advantages of the present invention, and its most novel features, will become apparent to those skilled in the art by perusing the accompanying specifications, drawings and claims.

It is to be understood that although the invention disclosed herein is fully capable of achieving the objects and providing the advantages described, the characteristics of the invention described herein are merely illustrative of the preferred embodiment. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends a method and article for making photocopies and telefax documents secure, i.e, unreadable by a casual observer. The method comprises optically encoding, by the originator, a document to be transmitted, and optically decoding, by the recipient, the transmitted document.

To encode a document, a mask with periodically alternating transparent and opaque, white-colored areas is placed over an original document, and a copy made of the document. The size of the opaque areas, and the spacing or period interval between the areas, are of the proper dimensions to make text contained in the original document unreadable in the photocopy made of the masked original.

After a first masked photocopy of an original document has been made, the mask is again placed over the original document, but in a position displaced by the period interval. Thus, the second masked photocopy is also unreadable, but contains segments of characters which were deleted from the first masked photocopy.

The first and second masked photocopies made as described above are transmitted to the intended recipient of the information contained in the original document. Transmission is effected by conveying the two actual photocopies ("hardcopies") to the recipient by conventional means. When a secure message is to be telefaxed, facsimiles of the two masked photocopies are sent via a telefax machine to the intended recipient.

The recipient of the two separately unreadable masked photocopies, or facsimiles thereof, "decodes" the document pair as follows. First, a photocopy machine having the capability of copying a document onto a transparency is used to make, on a transparent sheet, a photocopy of either the first or second masked photocopy. Then the transparency, which contains approximately half of the text of the original document, is placed over the other of the two masked photocopies. The transparency is positioned relative to the photocopy beneath it so that portions of the text missing in the transparency are filled in by the lower photocopy.

BRIEF DESCRIPTION OF THE DRAWINGS

FIG. 3 is a magnified fragmentary view of the mask of FIG. 1.

FIG. 4 is an upper plan view of a typical document to be transmitted by a secured method according to the present invention.

FIG. 5 is an upper plan view showing the mask of FIG. 1 placed over the document of FIG. 4, preparatory to placing the document and mask into a photocopying machine for the purpose of making a first masked copy of the document.

FIG. 6 is an upper plane view showing the mask of FIG. 1 flipped over so that its reverse side is up and placed over the document of FIG. 4, preparatory to placing the document and mask into a photocopying machine for the purpose of making a second masked copy of the document.

FIG. 9 is an upper perspective view of another embodiment of a security mask according to the present invention, showing the mask sandwiching the document of FIG. 4, preparatory to placing the document and mask into a photocopying machine for the purpose of making a first masked photocopy of the document.

FIG. 10 is an upper perspective view of the document of FIG. 4 and mask of FIG. 9, showing the mask flipped over so that the rear half of the mask overlies the document, preparatory to making a second masked photocopy of the document.

DETAILED DESCRIPTION OF THE INVENTION

Referring now to FIGS. 1 through 10, articles and methods for making coded copies of documents which are thereby rendered unreadable without suitable decoding means, and for decoding the encoded documents, are disclosed.

Figure 1:
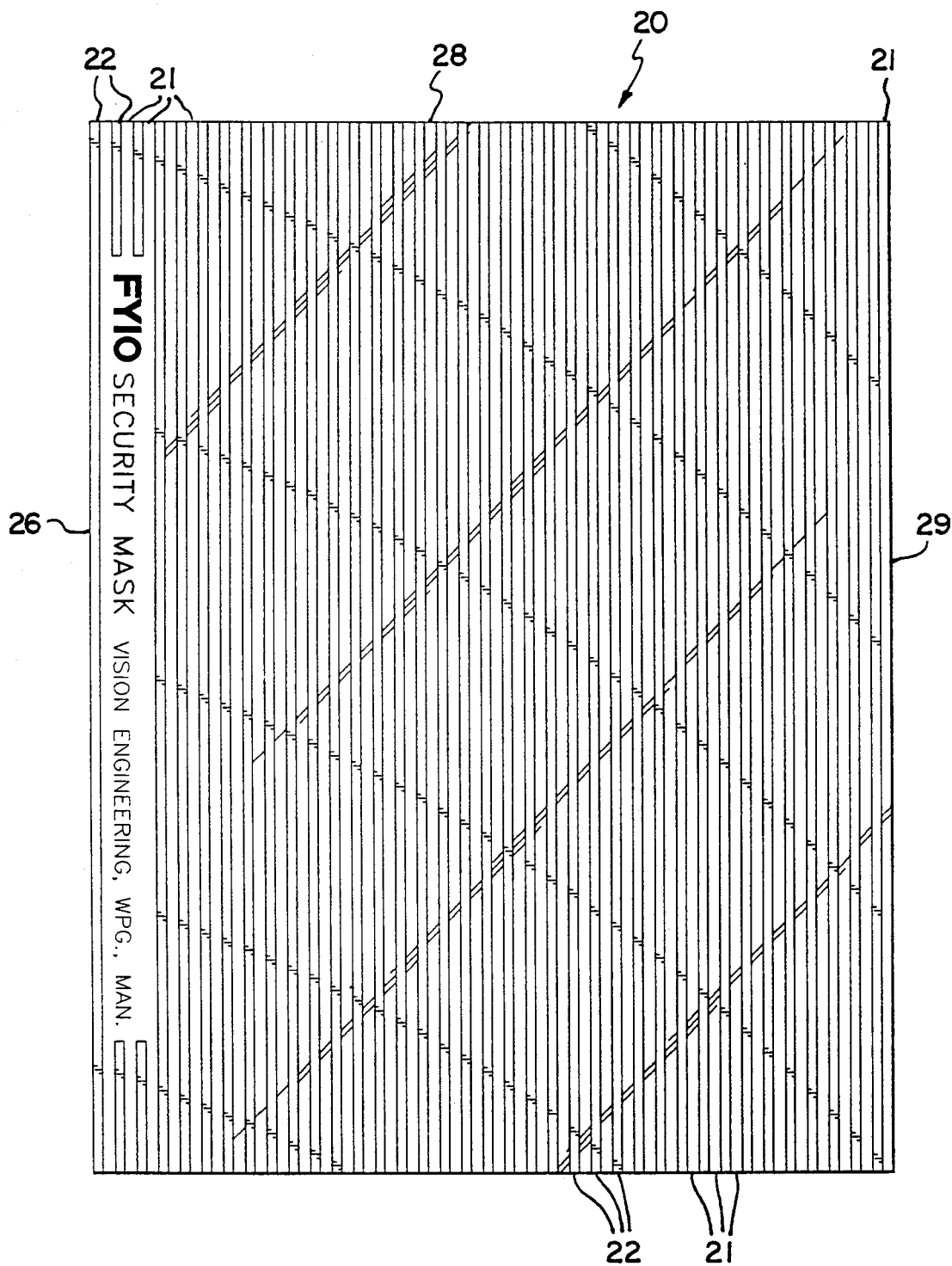
FIG. 1 is an upper plan view of a security mask according to the present invention.

FIG. 1 is an upper plan view of one embodiment of an encoding mask 20 according to the present invention. As shown in FIG. 1, the mask 20 is made of any suitable transparent material, such as a thin sheet of cellulose acetate, for example. The material from which mask 20 is made is of any desired thickness. Thus, a suitable thickness range would be from a fraction of a mil to several mils. Mask 20 may be of any convenient size, typically of the proper size to cover an 8½" by 11" letter-size sheet, for example.

Mask 20 has a plurality of transparent columnar areas 21 of equal width spaced apart at regular intervals and interspersed with opaque columnar areas 23, also of constant width. Opaque columns 23 are colored white, so they will not be visible in a photocopy made of the mask, for reasons which are described below. The width of transparent columns 21 and opaque columns 22 is chosen so that a message contained in printed text will be rendered unreadable by placing mask 20 over the text, as shown in FIG. 5. Thus, the width of opaque columns 22 should be approximately equal to one-half of the width of printed characters that it is desired to obscure. For example, for a courier 10 point LPI type font, I have found that a suitable width for opaque columns 22 is approximately 2.75 mm.

For reasons which will become apparent in the description of the method according to the present invention given below, the width of transparent columns 21 of mask 20 is preferably slightly larger than the width of opaque columns 22. Thus, as shown in FIG. 3, a suitable choice for the width of transparent columns 21 would be 3.75 mm., for use with opaque columns 22 having a width of 2.75 mm.

Figure 2:
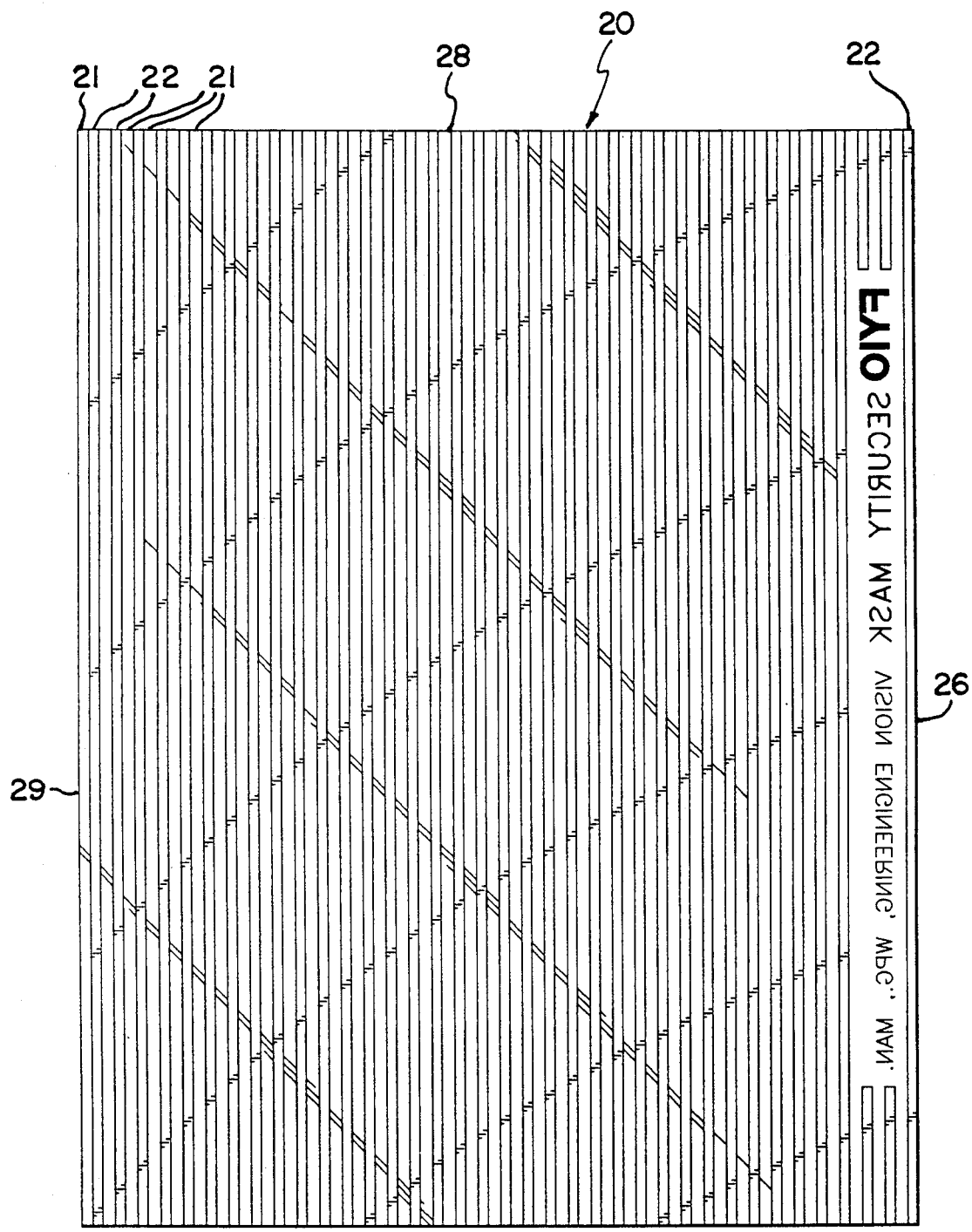
FIG. 2 is a lower plan view of the mask of FIG. 1.

Mask 20 preferably has an odd number of transparent columns 21 and an odd number of opaque columns 22. Thus, when mask 20 is flipped over, as shown in FIG. 2, a lateral edge of a document aligned with the edge of the mask which was formerly adjacent an opaque column 22 will then be adjacent a transparent column 21, and vice versa.

FIGS. 4, 5 and 6 illustrate the method of using mask 20 to encode a document. As shown in FIG. 4, a desired format for a document 23 to be encoded by the method of the present invention comprises a header section 24 and a message section 25. Header section 24 typically would contain the name, address and/or telefax number of the intended recipient. The header section 24 would also desirably contain directions on how to decode a message encoded by the method described below, as shown in FIG. 7.

FIG. 5 shows the mask 20 of FIG. 1 placed over the document 23 of FIG. 4, preparatory to placing the document into a photocopying machine or telefax machine to perform the first step in encoding a document according to the present invention. As shown in FIG. 5, the left hand edge 26 of mask 20 is aligned with left hand edge 27 of document 23. Also the top edge 28 of mask 20 is positioned above the upper edge of message section 25 of document 23, and below header section 24.

Figure 7:
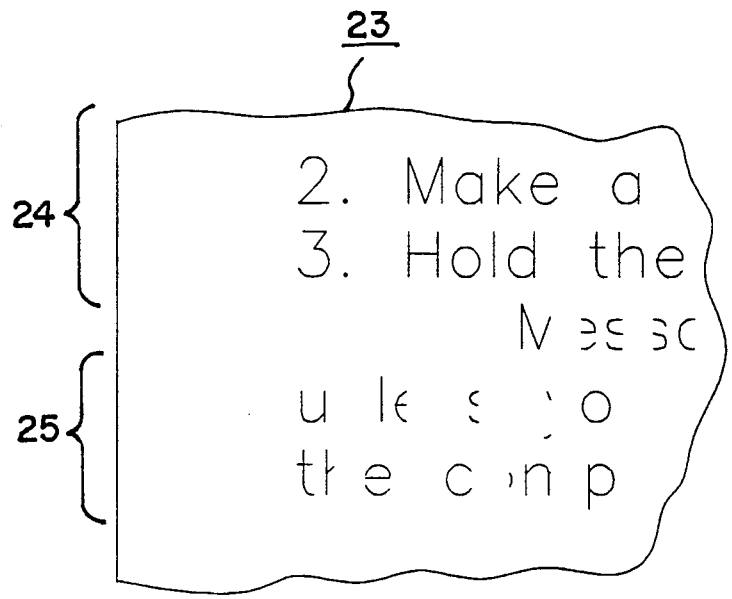
FIG. 7 is a fragmentary upper plan view of the first masked photocopy made as shown in FIG. 5.

As shown in FIGS. 5 and 7, the plurality of opaque columns 22 obscures slightly less than 50% of message section 25 of document 23. Thus, the text of message section 25 of document 23 is rendered unreadable by the superposition of mask 20, shown in FIG. 7. Accordingly, a photocopy or telefax facsimile of document 23 overlain by mask 20 would also be unreadable. A first masked photocopy is made of document 23, overlain by mask 20.

FIG. 6 shows mask 20 flipped over and placed over the document 23 of FIG. 4, preparatory to placing the document into a photocopying machine or telefax machine to perform the second of two steps in encoding a document according to the method of the present invention. As shown in FIG. 6, the right hand edge 29 of mask 20, rather than left hand edge 26, is now aligned with left and edge 27 of document 23.

Figure 8:
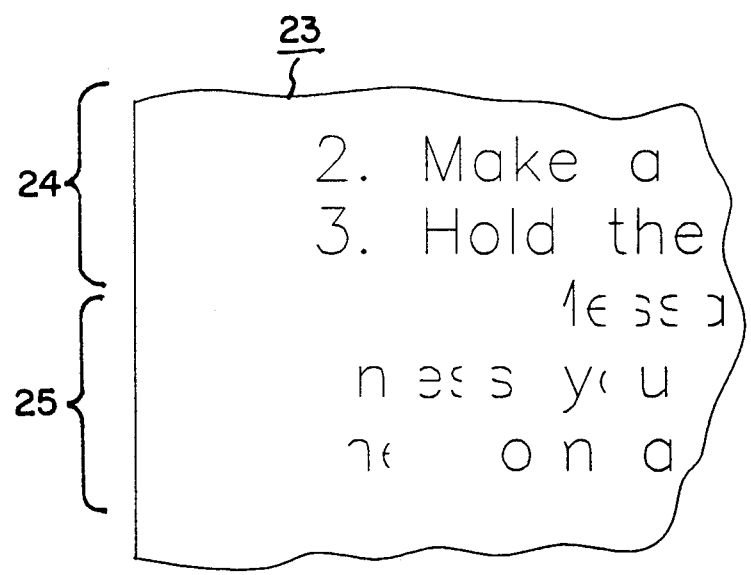
FIG. 8 is a fragmentary upper plan view of the second masked photocopy made as shown in FIG. 6.

Now it will be recalled that mask 20 has an odd number of transparent columns 21 and an odd number of opaque columns 22. Therefore, in the relationship between document 23 and mask 20 shown in FIG. 6, left hand edge 27 of document 23 is adjacent a transparent column 21 with the mask flipped over, whereas that edge was adjacent an opaque column 22 in the configuration shown in FIG. 5. Thus, those portions of the message section 25 of document 23 which were obscured by opaque columns 22 in the configuration shown in FIG. 5 are visible in the configuration shown in FIG. 6. Of course, as shown in FIGS. 6 and 8, that portion of message 25 viewable through realigned mask 20 as shown in FIG. 6, is still unreadable, for the reasons described above. A second masked photocopy is made of document 23, overlain by reversed mask 20.

After first and second masked photocopies, i.e., "coded halves", of message section 25 of an original document 23 have been produced as described above and depicted in FIGS. 5 and 7, and 6 and 8, respectively, the first and second coded halves are physically transmitted to the intended recipient, by hand-carrying, inter-office mail, or any other conventional means. Alternatively, facsimiles of the first and second coded halves may be transmitted by telefax machine to the intended recipient. In either case, the two coded halves must be decoded to produce a readable message as follows.

In principle, the decoding of first and second coded halves produced as shown in FIGS. 5 and 6 is accomplished by laying one coded half over the other, so that portions of characters missing from one coded half are supplied by the other coded half, and vice versa. Thus one may decode a message by placing either coded half over the other in proper alignment and illuminating both copies from the rear by a bright light. Alignment of the two coded halves is readily accomplished by aligning encoded characters in the header section 24 of document 23. If desired, fiduciary marks can be incorporated into mask 20 to facilitate alignment. For example, a standard cross hair or bullseye pattern, of the type commonly used in various graphics arts fields, could be placed at diagonally opposed corners of mask 20.

A preferred method of decoding first and second coded halves produced as shown in FIGS. 5 and 6 involves making on a transparency of copy of either coded half, the first one, for example. The transparency, which contains approximately one-half of the character data corresponding to message section 25 of document 23, is then placed over the other coded half, which may be on an ordinary sheet of relatively opaque paper. The transparency and opaque photocopy are then brought into alignment exactly as described above. Since most photocopiers produce size reduction or other distortions in copies, it is desirable to use the same photocopy machine to make a photocopy of the second coded half, and place that under the transparency, rather than the originally received coded half, thus resulting in better matching of character segments.

As noted above, transparent columns 21 of mask 20 are preferably slightly wider than opaque columns 22. Therefore, each masked photocopy, produced as shown in FIGS. 5 and 6, contain somewhat more than 50% of a message data contained in message section 25 of the document 23. This larger amount of message data facilitates alignment of the two masked photocopies to produce a readily readable decoded message.

FIGS. 9 and 10 illustrate an alternate embodiment 40 of a decoder mask according to the present invention.

Mask 40 consists essentially of a double-width sheet of acetate material similar to that of mask 20 shown in FIGS. 1 through 3, folded and permanently creased into an article having approximately the same width as mask 20. Thus, mask 40 has a front sheet 41, joined to a rear sheet 42 at left-hand edge fold 43. Also, as shown in FIGS. 9 and 10, both sheets 41 and 42 of mask 40 are provided with a plurality of transparent columnar areas or strips 44 interspersed with opaque columnar areas 45.

Transparent strips 44 and opaque strips 45 of mask 40 may have exactly the same size, shape, spacing and function as transparent strips 21 and opaque strips 22 of mask 20 described above. Thus, a suitable width for opaque strips 45 is approximately 2.75 mm., while a corresponding suitable width for transparent strips 44 would be about 3.75 mm.

As shown in FIGS. 9 and 10, left-hand edge fold 43 of mask 40 coincides with a boundary line between a transparent strip 44 and an opaque strip 45. Thus as shown in FIGS. 9 and 10, each opaque strip 45 on front sheet 41 and rear sheet 42 is positioned equidistant between a pair of opaque strips on the rear sheet or front sheet, respectively. Since the width of each opaque strip 45 is approximately 1 mm. less than the width of transparent strips 44, each lateral side of an opaque strip 45 is spaced apart approximately 0.5 mm. from the adjacent opaque strips on the opposite sheet.

Mask 40 is used exactly as mask 20. However, horizontal alignment of mask 40 with a document 23 is facilitated, as shown in FIGS. 9 and 10, by inserting the document between the front sheet 41 and rear sheet 42 of mask 40, until left-hand edge 27 of document 23 abuts the inner edge of left-hand edge fold 43.

As shown in FIG. 9, a first masked photocopy ("first coded half") of document 23 is made by inserting the document between front sheet 41 and rear sheet 42 of mask 40 until left-hand edge 27 of the document abuts left-hand edge fold 43 of the mask. A photocopy is then made of document 23 and overlying front sheet 41 of mask 40, producing the first coded half. Then, as shown in FIG. 10, mask 40 is flipped over, document 23 inserted until its right-hand edge abuts edge fold 43, and a second masked photocopy ("second coded half") made. First and second coded halves are decoded as described above.

What is claimed is:

1. A method for rendering information contained in a document unreadable to a casual observer comprising:
   a. performing a first masking of said document by covering said document with a mask having alternating transparent and opaque regions, said opaque regions obscuring sufficient information on said document to make said document unreadable,
   b. forming an image of said first masked document, said image being referred to as a first coded half-image,
   c. performing a second masking of said document by covering said document with a mask having alternating transparent and opaque regions, said opaque regions obscuring those portions of said information on said document which were not obscured in said first masking operation, and
   d. forming an image of said second masked document, said image being referred to as a second half-image, whereby superimposing said first and second half-images produces a readable reproduction of said document.

2. The method of claim 1 further including transmitting said first and second coded half images.

3. The method of claim 2 further including decoding said first and second coded half images to render said coded information readable, said decoding comprising:
   a. forming on a transparent overlay an image of said first and second coded half image,
   b. placing said transparent overlay in overlying relationship to said second or first coded half image, and
   c. aligning said transparent overlay with respect to said coded half image beneath said overlay so that information missing from said overlay is viewable through said overlay on said underlying coded half image.

4. The method of claim 3 wherein said alternating transparent and opaque regions of said mask used in performing said first masking are further defined as being so arranged as to allow an image of approximately 50% of said information contained in said document to be transmitted through said transparent regions.

5. The method of claim 4 wherein said mask used in performing said second masking is further defined as having alternating opaque and transparent regions substantially complementary to the alternating transparent and opaque regions of said first mask.

6. The method of claim 5 wherein said first and second masks are identical.

7. The method of claim 6 wherein said opaque regions of said first and second masks are white colored.

8. The method of claim 7 wherein said opaque regions and said transparent regions are spatially periodic.

9. The method of claim 8 wherein said periodicity is two-dimensional.

10. The method of claim 8 wherein said periodicity is one-dimensional.

11. The method of claim 10 wherein said opaque regions are further defined as being parallel columns.

12. The method of claim 11 wherein said columns are of equal width.

13. The method of claim 12 wherein said columns are spaced apart at equal intervals.

14. The method of claim 13 wherein said transparent regions are further defined as parallel columns of a width greater than said opaque columns.

15. A mask for optically encoding photocopies comprising:

first and second sheets of material attached to one another by means causing said sheets to be in parallel alignment with one another and adapted to receive a document between said sheets, said first sheet of material having alternating opaque and transparent areas, said opaque areas, when directly overlying information on said document, obscuring regions of said information on said document beneath said first sheet sufficiently to make a first image of said document viewed through said first sheet unreadable, said second sheet of material having alternating opaque and transparent areas substantially complementary to said alternating transparent and opaque areas of said first sheet, when said first sheet overlies said second sheet, said opaque areas, whereby when said document is removed from said mask, said mask flipped over and said document re-inserted into said mask so that said second sheet directly overlies said information on said document, said opaque areas of said second sheet obscure regions of said information on said document beneath second sheet to make a second image of said document viewed through said first sheet unreadable, said first and second images being superimposable to produce a readably composite image of said document.

16. The mask of claim 15 wherein said opaque regions are of a color which is invisible to a photocopying machine of the type which the mask is intended to be used with.

17. The mask of claim 16 wherein said opaque region is further defined as being white.

18. The mask of claim 16 wherein said opaque regions are spatially periodic.

19. The mask of claim 18 wherein said periodicity is two-dimensional.

20. The mask of claim 19 wherein said transparent regions of said first and second sheets occupy more than 50 percent of the area of said sheets.

21. The mask of claim 18 wherein said periodicity is one-dimensional.

22. The mask of claim 21 wherein said transparent regions of said first and second sheets occupy more than 50 percent of the area of said sheets.

23. The mask of claim 21 wherein said opaque regions are further defined as being parallel columns.

24. The mask of claim 23 wherein said columns are of equal width.

25. The mask of claim 24 wherein said columns are spaced apart at equal intervals.

26. The mask of claim 25 wherein said transparent regions are further defined as parallel columns of a width greater than said opaque columns.

27. The mask of claim 26 wherein said transparent regions of said first and second sheets occupy more than 50 percent of the area of said sheets.

* * * * *